US009100501B2

(12) United States Patent  (10) Patent No.: US 9,100,501 B2
Guedalia et al.  (45) Date of Patent: Aug. 4, 2015

(54) METHODS AND SYSTEMS FOR PERFORMING AUTHENTICATION AND AUTHORIZATION IN A USER-DEVICE ENVIRONMENT

(75) Inventors: Jacob Guedalia, Newton, MA (US); Isaac David Guedalia, Bet Shemesh (IL)

(73) Assignee: QUALCOMM INCORPORATED, San Diego, CA (US)

( * ) Notice: Subject to any disclaimer, the term of this patent is extended or adjusted under 35 U.S.C. 154(b) by 1479 days.

(21) Appl. No.: 12/029,782

(22) Filed: Feb. 12, 2008

(65) Prior Publication Data

US 2008/0192910 A1  Aug. 14, 2008

Related U.S. Application Data

(60) Provisional application No. 60/889,305, filed on Feb. 12, 2007, provisional application No. 60/889,959, filed on Feb. 15, 2007.

(51) Int. Cl.

| H04M 11/00 | (2006.01) |
| H04M 15/00 | (2006.01) |
| H04W 4/24 | (2009.01) |

(52) U.S. Cl.
CPC .............. *H04M 15/00* (2013.01); *H04M 15/41* (2013.01); *H04M 15/43* (2013.01); *H04M 15/44* (2013.01);

(Continued)

(58) Field of Classification Search
CPC .... H04W 52/24; H04W 52/12; H04L 1/0003; H04L 29/06027; H04L 29/06326; H04M 3/42042; H04M 1/57; H04M 1/575; H04M 2207/18; H04M 1/72519; H04M 7/006

USPC .............................. 455/69, 415, 406; 370/352
See application file for complete search history.

(56) References Cited

U.S. PATENT DOCUMENTS

| 4,751,728 A | 6/1988 | Treat |
| 4,799,253 A | 1/1989 | Stern et al. |

(Continued)

FOREIGN PATENT DOCUMENTS

| DE | 10341737 A1 | 4/2005 |
| EP | 1179941 A | 2/2002 |

(Continued)

OTHER PUBLICATIONS

Saravanan Shanmugham, et al., Daniel C. Burnett, "Media Resource Control Protocol Version 2(MRCPv2)", IETF Standard-Working-Draft, Internet Engineering Task Force, IETF, vol. Speechsc, No. 6, pp. 1-176 (2005).

(Continued)

*Primary Examiner* — William D Cumming
(74) *Attorney, Agent, or Firm* — Muncy, Geissler, Olds & Lowe, P.C.

(57) ABSTRACT

A method of authenticating a caller and authorizing a callee in a user-device environment may include receiving, by a gateway, a logon request comprising information associated with a caller and determining whether the caller is a subscriber based on at least a portion of the received caller information. If the caller is a subscriber, an other gateway may receive information associated with a callee who belongs to a contact list associated with the caller. The other gateway may determine whether the callee is authorized based on at least the callee information and the caller information, and if the callee is authorized, a call between the caller and the callee may be connected.

21 Claims, 12 Drawing Sheets

(52) U.S. Cl.
CPC .............. *H04M 15/62* (2013.01); *H04M 15/80*
(2013.01); *H04W 4/24* (2013.01); *H04M*
*2215/0104* (2013.01); *H04M 2215/0152*
(2013.01); *H04M 2215/0164* (2013.01)

(56) References Cited

U.S. PATENT DOCUMENTS

| | | |
|---|---|---|
| 5,570,417 A | 10/1996 | Byers |
| 5,577,100 A | 11/1996 | McGregor et al. |
| 5,635,940 A | 6/1997 | Hickman et al. |
| 5,848,128 A | 12/1998 | Frey |
| 5,878,122 A | 3/1999 | White et al. |
| 5,913,162 A | 6/1999 | Gourdin et al. |
| 5,946,618 A | 8/1999 | Agre et al. |
| 6,044,263 A | 3/2000 | Valentine et al. |
| 6,188,762 B1 | 2/2001 | Shooster |
| 6,205,126 B1 | 3/2001 | Moon |
| 6,333,931 B1 | 12/2001 | LaPier et al. |
| 6,564,261 B1 | 5/2003 | Gudjonsson et al. |
| 6,618,590 B1 | 9/2003 | Howe |
| 6,678,364 B2 | 1/2004 | Ruckart |
| 6,687,362 B1 | 2/2004 | Lindquist et al. |
| 6,697,858 B1 | 2/2004 | Ezerzer et al. |
| 6,707,811 B2 | 3/2004 | Greenberg et al. |
| 6,751,457 B1 | 6/2004 | Martin |
| 6,775,375 B1 | 8/2004 | Bhusri |
| 6,850,762 B1 | 2/2005 | Ala-Luukko et al. |
| 6,917,610 B1 | 7/2005 | Kung et al. |
| 6,937,873 B2 | 8/2005 | Levy et al. |
| 7,085,260 B2 | 8/2006 | Karaul et al. |
| 7,099,652 B2 * | 8/2006 | Brown et al. ............... 455/406 |
| 7,110,772 B1 | 9/2006 | Wu |
| 7,127,488 B1 | 10/2006 | Scott et al. |
| 7,130,620 B2 | 10/2006 | Forman et al. |
| 7,139,370 B1 | 11/2006 | Tse |
| 7,243,075 B1 | 7/2007 | Shaffer et al. |
| 7,257,837 B2 | 8/2007 | Xu et al. |
| 7,274,786 B2 | 9/2007 | Fleischer, III et al. |
| 7,280,652 B2 | 10/2007 | Bocking et al. |
| 7,369,650 B1 | 5/2008 | Bhusri |
| 7,395,057 B2 | 7/2008 | Awasthi et al. |
| 7,436,820 B2 | 10/2008 | Beck et al. |
| 7,471,692 B1 | 12/2008 | Erickson |
| 7,480,723 B2 | 1/2009 | Grabelsky et al. |
| 7,529,231 B2 | 5/2009 | Soo et al. |
| 7,548,611 B2 | 6/2009 | Howe |
| 7,620,404 B2 | 11/2009 | Chesnais et al. |
| 7,634,509 B2 | 12/2009 | Onyon et al. |
| 7,701,883 B2 | 4/2010 | Beckemeyer |
| 7,738,861 B2 | 6/2010 | Fournier |
| 7,974,610 B2 | 7/2011 | Nachum |
| 8,116,836 B2 | 2/2012 | Ki |
| 8,391,848 B2 | 3/2013 | Guedalia et al. |
| 2001/0038624 A1 | 11/2001 | Greenberg et al. |
| 2002/0013163 A1 | 1/2002 | O'Prey |
| 2002/0099670 A1 | 7/2002 | Jakobsson |
| 2002/0120760 A1 | 8/2002 | Kimchi et al. |
| 2002/0129103 A1 | 9/2002 | Birkler et al. |
| 2002/0169984 A1 | 11/2002 | Kumar et al. |
| 2002/0193107 A1 | 12/2002 | Nascimento |
| 2003/0013441 A1 | 1/2003 | Bhogal et al. |
| 2003/0046404 A1 | 3/2003 | O'neill et al. |
| 2003/0046405 A1 | 3/2003 | O'neill et al. |
| 2003/0050051 A1 | 3/2003 | Vilander |
| 2003/0060211 A1 | 3/2003 | Chern et al. |
| 2003/0091024 A1 | 5/2003 | Stumer |
| 2003/0115138 A1 | 6/2003 | Brown et al. |
| 2003/0118175 A1 | 6/2003 | Hariri et al. |
| 2003/0148790 A1 | 8/2003 | Pappalardo et al. |
| 2003/0190025 A1 | 10/2003 | Okamura et al. |
| 2004/0019539 A1 | 1/2004 | Raman et al. |
| 2004/0037396 A1 | 2/2004 | Gray et al. |
| 2004/0044771 A1 | 3/2004 | Allred et al. |
| 2004/0143669 A1 | 7/2004 | Zhao et al. |
| 2004/0156394 A1 | 8/2004 | Westman |
| 2004/0165714 A1 | 8/2004 | Pinault |
| 2004/0202117 A1 | 10/2004 | Wilson et al. |
| 2004/0203643 A1 | 10/2004 | Bhogal et al. |
| 2004/0213209 A1 | 10/2004 | O'Connor et al. |
| 2004/0229644 A1 | 11/2004 | Heie et al. |
| 2004/0235509 A1 | 11/2004 | Burritt et al. |
| 2005/0025043 A1 | 2/2005 | Mussman et al. |
| 2005/0027867 A1 | 2/2005 | Mueller et al. |
| 2005/0033852 A1 | 2/2005 | Tenhunen |
| 2005/0036597 A1 | 2/2005 | Kobrosly et al. |
| 2005/0059418 A1 | 3/2005 | Northcutt |
| 2005/0070230 A1 | 3/2005 | Das et al. |
| 2005/0102257 A1 | 5/2005 | Onyon et al. |
| 2005/0138571 A1 | 6/2005 | Keskar et al. |
| 2005/0157858 A1 | 7/2005 | Rajagopalan et al. |
| 2005/0163065 A1 | 7/2005 | Yule |
| 2005/0171799 A1 | 8/2005 | Hull et al. |
| 2005/0182798 A1 | 8/2005 | Todd et al. |
| 2005/0198031 A1 | 9/2005 | Pezaris et al. |
| 2005/0198172 A1 | 9/2005 | Appelman et al. |
| 2005/0198365 A1 | 9/2005 | Wei |
| 2005/0221847 A1 | 10/2005 | Brehler et al. |
| 2005/0249344 A1 | 11/2005 | Mueller et al. |
| 2005/0273512 A1 | 12/2005 | Cho |
| 2006/0018306 A1 | 1/2006 | Nishida et al. |
| 2006/0018311 A1 | 1/2006 | Kobayashi et al. |
| 2006/0023701 A1 | 2/2006 | Nishida et al. |
| 2006/0026288 A1 | 2/2006 | Acharya et al. |
| 2006/0029042 A1 | 2/2006 | Nishida et al. |
| 2006/0029043 A1 | 2/2006 | Nishida et al. |
| 2006/0029046 A1 | 2/2006 | Nishida et al. |
| 2006/0031368 A1 | 2/2006 | deCone |
| 2006/0040711 A1 | 2/2006 | Whistler |
| 2006/0077932 A1 | 4/2006 | Takeda et al. |
| 2006/0159456 A1 | 7/2006 | Gumaste et al. |
| 2006/0168326 A1 | 7/2006 | Baldwin et al. |
| 2006/0173961 A1 | 8/2006 | Turski et al. |
| 2006/0205400 A1 | 9/2006 | Kiyomoto |
| 2006/0209690 A1 | 9/2006 | Brooke |
| 2006/0236388 A1 | 10/2006 | Ying et al. |
| 2006/0246877 A1 | 11/2006 | Kashanian et al. |
| 2006/0248146 A1 | 11/2006 | Wilk |
| 2006/0270392 A1 | 11/2006 | Scott et al. |
| 2006/0270400 A1 | 11/2006 | DaSilva et al. |
| 2007/0005776 A1 | 1/2007 | Hansen et al. |
| 2007/0016682 A1 | 1/2007 | Hodgson |
| 2007/0060100 A1 | 3/2007 | Watler et al. |
| 2007/0064607 A1 | 3/2007 | Moon et al. |
| 2007/0071006 A1 | 3/2007 | Bosch et al. |
| 2007/0112964 A1 | 5/2007 | Guedalia et al. |
| 2007/0143397 A1 | 6/2007 | Guedalia et al. |
| 2007/0162350 A1 | 7/2007 | Friedman |
| 2007/0281676 A1 | 12/2007 | Borras et al. |
| 2007/0287430 A1 | 12/2007 | Hosain et al. |
| 2008/0003964 A1 | 1/2008 | Alperin et al. |
| 2008/0013531 A1 | 1/2008 | Elliott et al. |
| 2008/0037524 A1 | 2/2008 | Koch et al. |
| 2008/0056208 A1 | 3/2008 | Hinrikus et al. |
| 2008/0056235 A1 | 3/2008 | Albina et al. |
| 2008/0070579 A1 | 3/2008 | Kankar et al. |
| 2008/0076409 A1 | 3/2008 | Hinrikus et al. |
| 2008/0096592 A1 | 4/2008 | Waytena et al. |
| 2008/0139210 A1 | 6/2008 | Gisby et al. |
| 2008/0159261 A1 | 7/2008 | Bessis |
| 2008/0159515 A1 | 7/2008 | Rines |
| 2008/0166999 A1 | 7/2008 | Guedalia et al. |
| 2008/0167019 A1 | 7/2008 | Guedalia et al. |
| 2008/0167020 A1 | 7/2008 | Guedalia et al. |
| 2008/0167039 A1 | 7/2008 | Guedalia et al. |
| 2008/0181165 A1 | 7/2008 | Guedalia et al. |
| 2008/0188227 A1 | 8/2008 | Guedalia et al. |
| 2008/0244023 A1 | 10/2008 | Guedalia et al. |
| 2008/0248795 A1 | 10/2008 | Petersen et al. |
| 2008/0263170 A1 | 10/2008 | Caron et al. |
| 2008/0305782 A1 | 12/2008 | Guedalia et al. |
| 2009/0190738 A1 | 7/2009 | Guedalia et al. |
| 2010/0080376 A1 | 4/2010 | Hartley et al. |
| 2011/0312308 A1 | 12/2011 | Willey |
| 2013/0137421 A1 | 5/2013 | Guedalia et al. |

(56) References Cited

U.S. PATENT DOCUMENTS

FOREIGN PATENT DOCUMENTS

| EP | 1517256 A2 | 3/2005 |
|---|---|---|
| EP | 1701569 A | 9/2006 |
| GB | 2391135 A | 1/2004 |
| WO | 9723083 | 6/1997 |
| WO | 98/47298 A3 | 10/1998 |
| WO | WO 9934628 A | 7/1999 |
| WO | 0198867 A2 | 12/2001 |
| WO | 0215030 A1 | 2/2002 |
| WO | 0221779 A1 | 3/2002 |
| WO | 0239237 A | 5/2002 |
| WO | WO 03032613 A | 4/2003 |
| WO | 03094011 A1 | 11/2003 |
| WO | 2005065296 A2 | 7/2005 |
| WO | 2006039552 A2 | 4/2006 |
| WO | WO 2006/044654 A | 4/2006 |
| WO | 2007001850 A1 | 1/2007 |
| WO | 2007005124 A2 | 1/2007 |
| WO | 2007025373 A1 | 3/2007 |
| WO | 2007109559 A2 | 9/2007 |
| WO | 2008013642 A2 | 1/2008 |

OTHER PUBLICATIONS

Sinnreich, et al., "SIP telephony device requirements and configuration draft-sinnreich-sipdev-req-07.txt", IETF Standard-Working-Draft, Internet Engineering Task Force, No. 7, pp. 1-37 (2005).
Griffin et al., "Integrating SIP, presence and FTP to provide wireless multimedia messaging", Wireless Communications and Networking Conference, IEEE Communications Society, 4:2581-2586 (2004).
Handley et al., "RFC 2543 SIP: Session Initiation Protocol", IETF Standard, Internet Engineering Task Force, pp. 1-153 (1999).
Handley et al., "SIP: Session Initiation Protocol", IETF, Standard-Working-Draft, Internet Engineering Task Force, vol. 4, pp. 1-83 (1997).
Petrie, Pingtel Corp., A Framework for SIP User Agent Profile Delivery draft-iet f-sipping-config-framework-02. txt., IETF Standard-Working-Draft, Internet Engineering Task Force, No. 2, pp. 1-22 (2004).
Colman Ho, "Voice Over Internet Protocol (VoIP) Overview", Presentation to TSACC, Mar. 23, 2004; www.isacc.ca/isacc/_doc/Book%2017%20-%202004/TSACC-04-31305.ppt.
Alcatel-Lucent, "Alcatel-Lucent OmniPCX Enterprise Communication Server: Delivering powerful, reliable and scalable IP communications to drive your 21st century business", 2007. http://www1.alcatel-lucent.com/com/en/ appcontent/opgss/ENT_OmniPCX%20Enterprise_datasheet_1007_EN_tcm228-1353221635.pdf.
SIP Connect, "CableLabs Proposal for SIP Connect 1.1", 2007; http://www.sipforum.org/component/option, com_docman/task,doc_view/gid,149/Itemid,75/.
NST, New Standard Telephony, Convergence Simplified, Company Profile, NST 2005; http://www.ns-tel.com/files/NST_Company_Profile.pdf.
Janne Lundqvist et al., Messaging-over-IP—A network for messaging and information services; http://www.ericsson.com/ericsson/corpinfo/publications/review/1999_03/files/1999035.pdf.
Case Study, Intel Centrino, Mobile Technology, Intel Xeon Processor MP, Shanghai GM, "Seamless Communications", http://www.intel.com/netcomms/technologies/voice/310998.pdf.
Kundan Narendra Singh, Thesis, "Reliable, Sealable and Interoperable Internet Telephony", Columbia University, 2006; http://www1.cs.columbia.edu/~kns10/publication/thesis.pdf.
Intel Communications Alliance, "TeleSym and Intel Deliver Voice-over-Internet-Protocol (VoIP) Enterprise Communication Solution", Jun. 2004; http://www.intel.com/network/csp/pdf/9003wp.pdf.
Sinnreich/Pulver Com H. et al.: "*SIP Telephony Device Requirements and Configuration*; draft-sinnreich-sipdev-req-08.txt", IETF Standard-Working-Draft, Internet Engineering Task Force, IETF, CH, No. 8, Oct. 1, 2005, XP015043067 ISSN: 0000-0004.
Rosenberg, J. et al.: "*SIP: Session Initiation Protocol*" 20020601; 20020600; Jun. 1, 2002, pp. 1-269, XP015009039.
Schulzrinne Columbia University B. Volz Ericsson H: "*Dynamic Host Configuration Protocol (DHCPv6) Options for Session Initiation Protocol (SIP) Servers*; rfe3319.txt", IETF Standard, Internet Engineering Task Force, IETF, CH. Jul. 1, 2003, XP015009189; ISSN: 0000-0003.
International Search Report and Written Opinion—PCT/US2008/053685, International Searching Authority—US, Alexandria, VA, Aug. 11, 2008.

\* cited by examiner

METHODS AND SYSTEMS FOR PERFORMING AUTHENTICATION AND AUTHORIZATION IN A USER-DEVICE ENVIRONMENT

B. CROSS REFERENCE TO RELATED APPLICATIONS

This application claims priority under 35 U.S.C. §119(e) to U.S. Provisional Application No. 60/889,305, filed Feb. 12, 2007 and U.S. Provisional Application No. 60/889,959 filed Feb. 15, 2007, the entireties of which are incorporated by reference herein. This application is related to U.S. patent application Ser. No. 11/971,605 filed Jan. 9, 2008.

C.-E. NOT APPLICABLE

F. BACKGROUND

Methods of communication have expanded beyond ordinary telephone calls. Today, millions of people worldwide communicate via text messages, VoIP, instant messaging, SMS and the like. In addition, telecommunications has evolved to utilize a personal computer as a primary means of communication.

Currently, the communications industry treats users and devices as disparate entities, even though users and devices interact with each other in various ways. For example, it is possible to identify a user based on the user's personal profile, preferences and/or the like. A device however, lacks an identity per se, apart from physical characteristics, such as a chip or a mobile telephone number. As such, there exists a communication disconnect between users and devices in a user-device environment.

G. SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

In an embodiment, a method of authenticating a caller and authorizing a callee in a user-device environment may include receiving, by a gateway, a logon request comprising information associated with a caller and determining whether the caller is a subscriber based on at least a portion of the received caller information. If the caller is a subscriber, an other gateway may receive information associated with a callee who belongs to a contact list associated with the caller. The other gateway may determine whether the callee is authorized based on at least the callee information and the caller information, and if the callee is authorized, a call between the caller and the callee may be connected.

In an embodiment, a system for authenticating a caller and authorizing a callee in a user-device environment may include a first gateway configured to authenticate a caller based on at least information associated with the caller and information associated with a plurality of subscribers. The system may also include a second gateway configured to authorize a callee based on one or more authorization preferences associated with the caller and information associated with the callee. The second gateway may be in communication with the first gateway, and the callee may belong to a contact list associated with the caller.

H. BRIEF DESCRIPTION OF THE DRAWINGS

Aspects, features, benefits and advantages of the present invention will be apparent with regard to the following description and accompanying drawings, of which:

I. DETAILED DESCRIPTION

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

Figure 1:
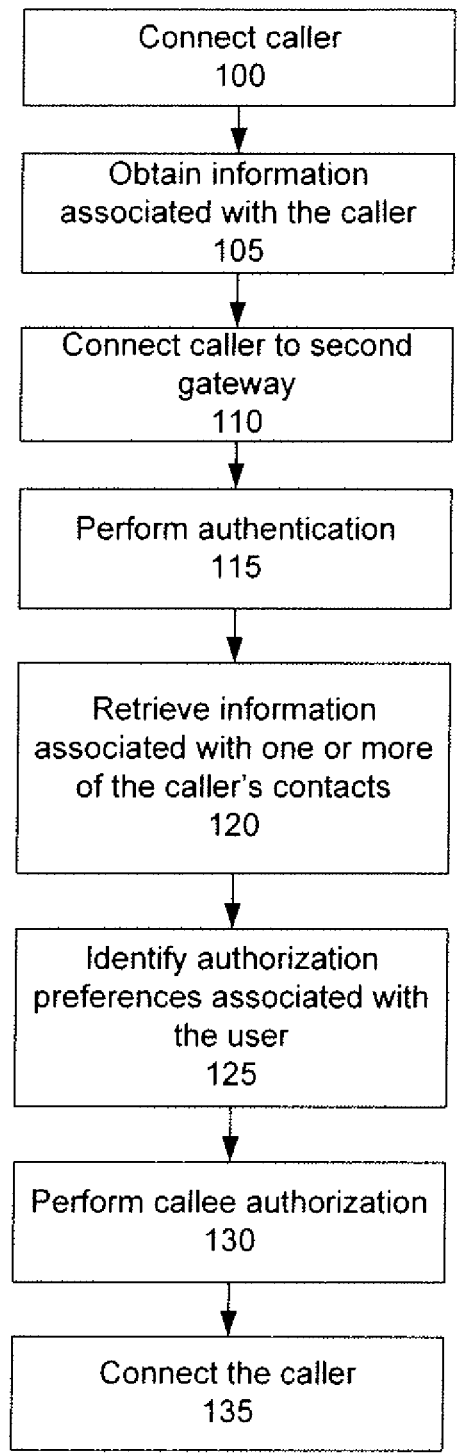
FIG. 1 illustrates a flow chart of an exemplary method of performing authentication and authorization in a user-device environment according to an embodiment.
Figure 2:
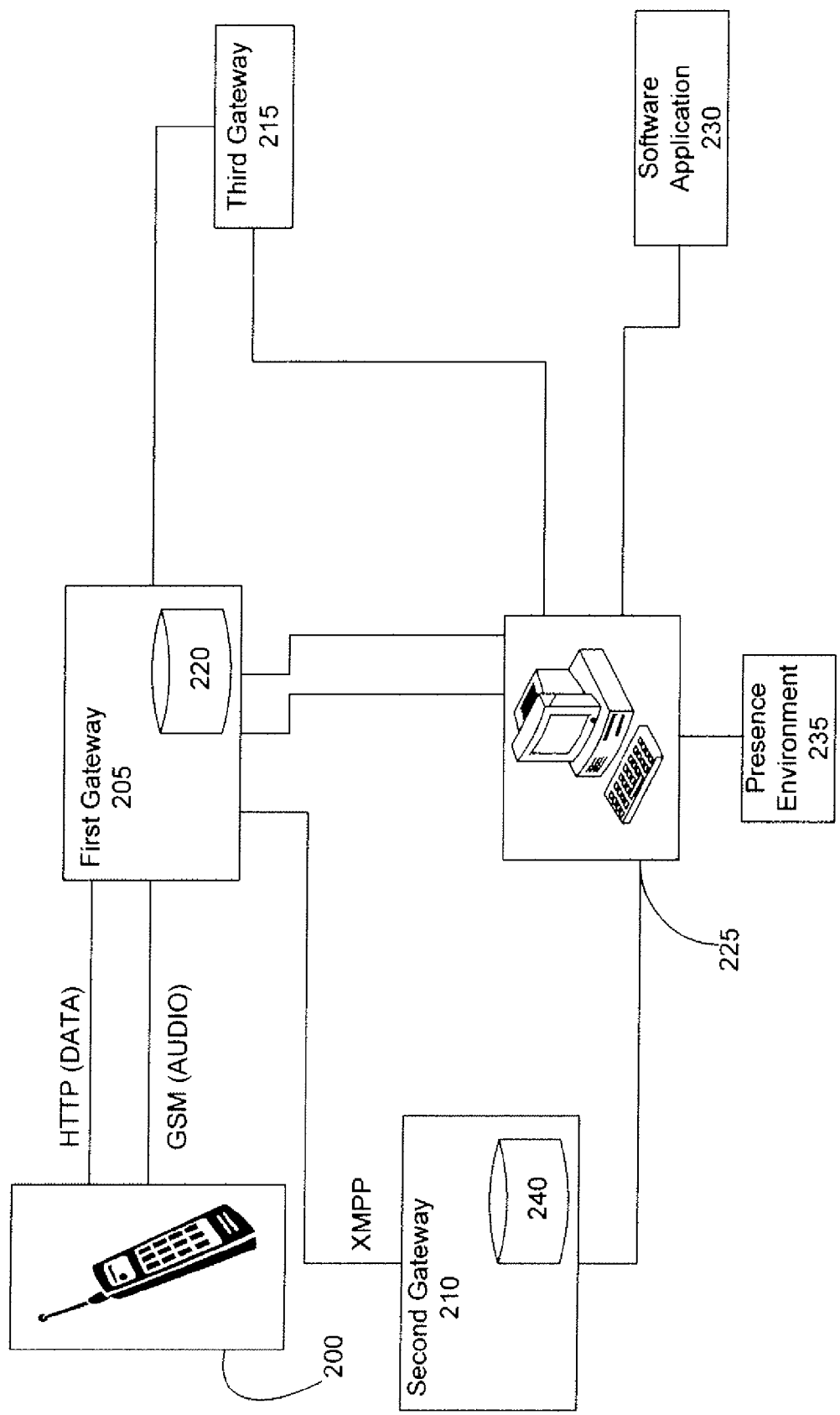
FIG. 2 depicts an exemplary system for performing authentication and authorization in a user-device environment according to an embodiment.

FIG. 1 illustrates a flow chart of an exemplary method of performing authentication and authorization in a user-device environment according to an embodiment. FIG. 2 depicts an exemplary system for performing authentication and authorization in a user-device environment according to an embodiment.

A user, or caller, may be connected 100 to a first gateway 205 by a mobile device 200, such as a cellular phone, a personal digital assistant ("PDA"), a media player or the like. In an embodiment, a caller may be connected to the first gateway 205 via a data request such as an HTTP request. Information associated with the caller may be obtained 105 by the first gateway 205 from the data request. For example, the caller's Mobile Systems International Subscriber Identity Number ("MSISDN") and/or namespace identification may be obtained 105. In an embodiment, a MSISDN may be a unique number that may identify a subscription in a mobile network. A namespace identification may be a unique identification associated with a caller such as an instant messaging screen name, a VoIP identification and the like.

In an embodiment, a MSISDN may be obtained 105 from the mobile device 200. For example, the first gateway may query an application on the mobile device for the MSISDN. Alternatively, the caller may manually input the MSISDN using the mobile device 200. For example, the caller may enter his mobile phone number including the area and/or country code. In another embodiment, the caller may specify the MSISDN and/or the namespace identification at registration. In an alternative embodiment, the first gateway 205 may obtain the MSISDN based on the caller's locale information. For example, upon registration, a caller may provide locale information such as an area code, a telephone number, a zip code or the like that corresponds to the caller's current location. In an embodiment, at least a portion of the locale information may be included in the data request. A server-data function may use the locale information from the data request to obtain the caller's corresponding MSISDN. In an embodiment, the server-data function may be on a server in communication with the first gateway 205.

In an embodiment, the first gateway 205 may connect 110 the caller to a second gateway 210. In an embodiment, the second gateway 210 may be a Wireless Village Gateway. The caller may be connected 110 to the second gateway 210 via a user-based protocol, such as Extensible Messaging and Presence Protocol ("XMPP") or the like. In an embodiment, the caller may also be connected to a presence environment 235. A presence environment 235 may be an environment in which one or more users may monitor the presence of and/or communicate with one or more other users.

In an embodiment, the caller may be authenticated 115 at the second gateway 210. Authentication 115 may verify the identity of the caller. In an embodiment, information associated with the caller may be compared with information associated with a plurality of known subscribers. Information associated with the plurality of subscribers may be stored in a storage medium 240, such as a database, that may be located on the second gateway 210. Alternatively, the storage medium 240 may be located remotely from the second gateway 210. In an embodiment, each subscriber may be associated with information such as a MSISDN, a namespace identification and/or the like.

In an embodiment, the MSISDN and/or the namespace identification associated with a caller may be transmitted from the first gateway 205 to the second gateway 210. The second gateway 210 may compare one or more of the MSISDN and the namespace identification to the MSISDNs and namespace identifications of known subscribers to determine whether the caller is a subscriber. The second gateway 210 may approve or deny the caller's request for logon based on this comparison. For example, if the caller is determined to be a subscriber, then the request may be approved. Otherwise, the request may be denied.

In an embodiment, if the caller's logon request is approved, information associated with one or more of the caller's contacts may be retrieved 120. In an embodiment, the retrieved information may include a contacts list associated with the caller. In an embodiment the contacts list may be retrieved 120 from one or more of the first gateway 205, the second gateway 210 or the presence environment 235. In an embodiment a direct inward dialing ("DID") number associated with each contact in the retrieved contact list may be transmitted from one or more of the first gateway 205, the second gateway 210 or the presence environment 235 to the mobile device 200.

In an embodiment, one or more authorization preferences associated with the caller may be used to authorize a callee. Authorization preferences may include an indication of the communication mode, such as "Chat Only," "Voice Only," or neither. Authorization preferences may also include a permission associated with a contact. For example, if a caller blocked a contact on his contact list, then the contact may not be allowed to communicate with the caller.

In an embodiment, the authorization preferences may be identified 125 by the first gateway 205. In an embodiment, identification 125 of one or more of the authorization preferences may include receiving the one or more authorization preferences from the caller's mobile device 200. In an embodiment, one or more of the authorization preferences may be predetermined by, for example, a service provider. For example, a service provider may set a default value associated with a communication mode authorization preference to be "Chat Only." If a caller wants to enable voice capability, the caller may request that the service provider upgrade the caller's service.

In an embodiment, one or more authorization preferences associated with the caller may have been previously transmitted to the first gateway 205 and stored on the storage medium 220 associated with the first gateway 205. For example, if a caller disabled, or blocked, a contact from his contact list, then this authorization preference may be received 125 by the first gateway 205 and stored in the storage medium 220 corresponding to the first gateway 205.

11 In an embodiment, a caller may customize his authorization preferences. This may be accomplished by installing a software application 230 on a computing device 225, such as a personal computer. The software application 230 may enable customized authorization preferences by allowing a caller to communicate with the first gateway 205 via a communication channel, such as HTTP.

In an embodiment, a caller may select a contact, or callee, with whom the caller wishes to communicate with from the caller's contact list. Software on the caller's mobile device 200 may embed information associated with the contact, such as the contact's namespace identification, in a User-to-User Information Element ("UUIE") field so that it may be transmitted when the call is placed. In an alternate embodiment, a short code representing at least a portion of information associated with the contact, such as the contact's namespace identification, may be retrieved from the storage medium 220 associated with the first gateway 205. The retrieved portion of information may be embedded in the UUIE field.

In an embodiment, the UUIE field may store 32 bytes. If the information associated with a callee exceeds 16 Unicode characters, it may be too large for the UUIE field to accurately store. In an embodiment, each Unicode character may be represented by two bytes. The first byte may be a code and the second byte may be a character. In an embodiment, embedding information in the UUIE may include stripping out the first byte from the information associated with the callee in all but the first character. This may allow the UUIE field to store information of up to 31 characters.

In an embodiment, a DID number associated with a callee may be received from the caller's mobile device 200. The DID number may be received by the first gateway 205 via a global system for mobile communication ("GSM") channel. In an embodiment, call information may also be transmitted to the first gateway 205. The call information may include one or more of the contact's namespace identification, short code, UUIE field and/or the like. In an embodiment, the contact's namespace identification and/or the short code may be embedded in the UUIE field.

In an embodiment, the first gateway 205 may convert the GSM channel to a session initiation protocol ("SIP"). The UUIE field and at least a portion of its corresponding information may be extracted from the incoming call information. In an embodiment, the storage medium 220 associated with the first gateway 205 may map the callee's namespace identification to the intended callee's namespace identification so the call may reach the desired callee.

In an embodiment, callee authorization may be performed 130. Callee authorization may verify that the callee with whom a caller wishes to communicate is a valid callee for that caller.

In an embodiment, the caller's MSISDN may be mapped to one or more of the caller's authorization preferences. The MSISDN may be automatically transmitted to the first gateway 205 when a call is placed. Alternatively, the caller's MSISDN may be embedded in the UUIE field. The MSISDN may be extracted from the UUIE field and mapped to one or more of the caller's authorization preferences.

In an embodiment, the first gateway 205 may use the one or more authorization preferences associated with the caller to authorize a callee. The first gateway 205 may compare the callee information that it receives to one or more of the authorization preferences associated with the caller. As such, an authorization process may use the caller's identify and the callee's identify to authorize a callee.

In an embodiment, when authorization is successfully completed, the first gateway may convert the GSM channel to a SIP REFER, via ISUP, and may send the SIP REFER to a third gateway 215 to connect 135 the call. In an embodiment, the third gateway 215 may transfer the call to a computing device associated with the intended callee, and communication may be successfully established between the caller's mobile device 200 and the callee's computing device. In an embodiment, the first gateway 205 may also convert the GSM channel to a real-time transport protocol ("RTP") channel to enable voice flow between the caller and the callee via the first gateway 205.

In an embodiment, authentication and/or authorization may be performed by different protocols in various environments. However, to successfully perform authentication and authorization, a data request from a caller may be converted to an appropriate protocol in order open communication between the caller and the callee. For example, the communication environments of providers may be fundamentally different. As such, each provider may utilize a specific protocol that best showcases its capabilities.

Figure 3:
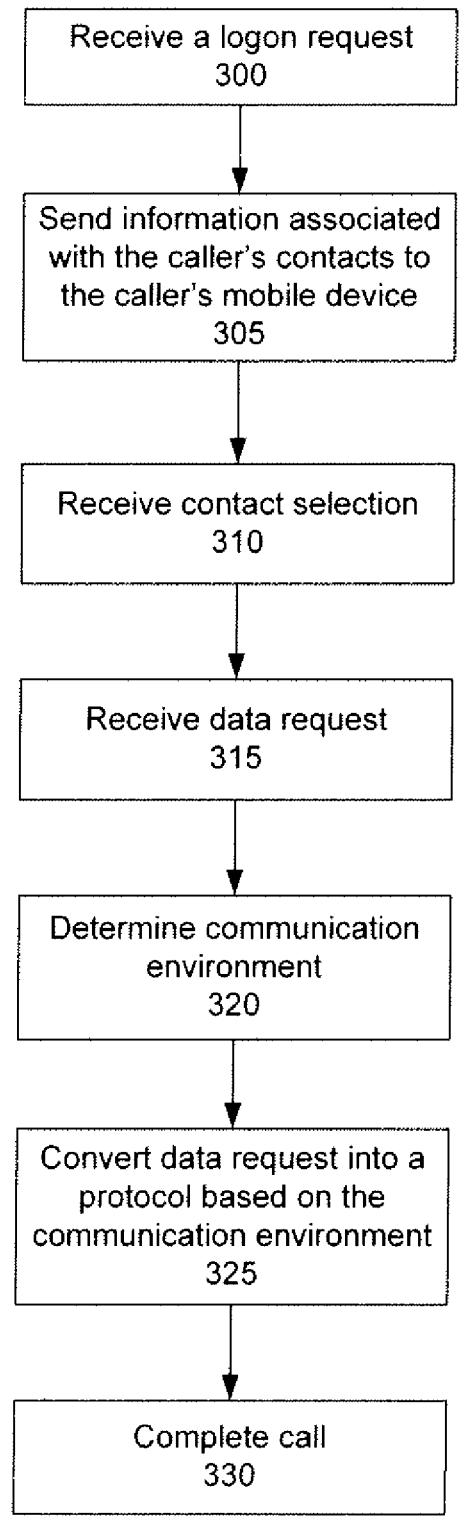
FIG. 3 illustrates a flow chart for an exemplary method of determining a provider associated with a callee and determining a corresponding protocol based on the provider according to an embodiment.
Figure 4:
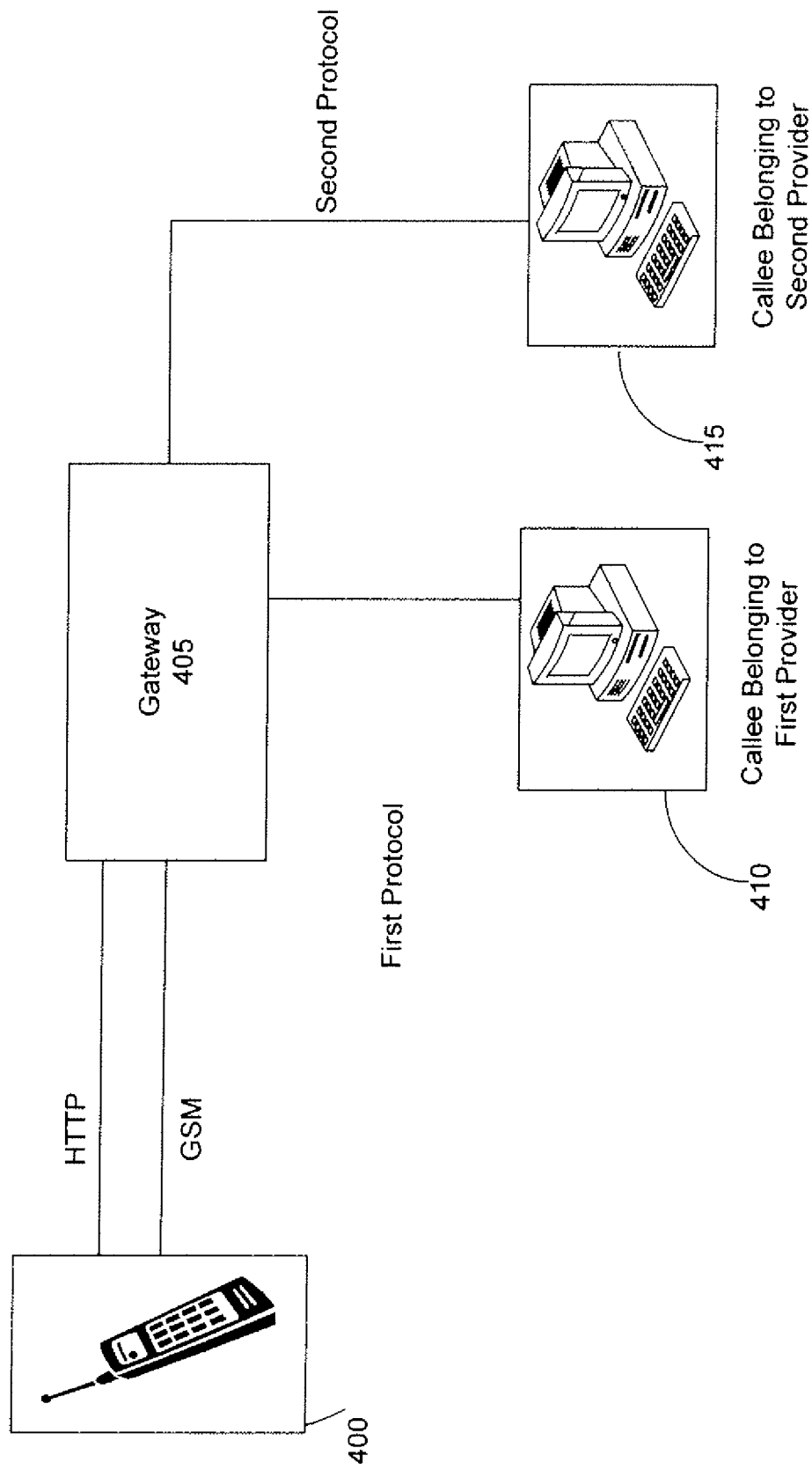
FIG. 4 illustrates an exemplary system for determining a provider associated with a callee and a corresponding protocol according to an embodiment.

FIG. 3 illustrates a flow chart for an exemplary method of determining a provider associated with a callee and determining a corresponding protocol based on the provider according to an embodiment. FIG. 4 illustrates an exemplary system for determining a provider associated with a callee and a corresponding protocol according to an embodiment.

In an embodiment, a gateway 405 may receive 300 a logon request from a mobile device 400 associated with a caller via a protocol, such as HTTP. Information associated with the caller's contacts, such as a contact list, may be sent 305 to the caller's mobile device 400 from the gateway 405. In an embodiment, the caller may select a contact from his contact list with whom to communicate. This selection may be received 310 by the gateway 405. A data request, such as an HTTP request, may be received 315 by the gateway 405. The call may be connected to the gateway 405 by a GSM audio channel. In an embodiment, the gateway 405 may determine 320 into which communication environment the caller is dialing. Based on the communication environment, the gateway 405 may convert 325 the data request to a protocol associated with the communication environment. For example, a first provider may utilize an XMPP protocol to enable communication in its communication environment, while a second provider may utilize a HTTP/DTBC protocol to enable communication in its communication environment. A caller may place a call to a callee who belongs to the first provider. The gateway 405 may determine 320 that the callee is a user of the first provider and may convert 325 the data request to an XMPP protocol. In an embodiment, the call may be completed 330 between the caller's mobile device 400 and a computing device 410, 415 associated with the callee, such as a personal computer or the like.

Figure 5:
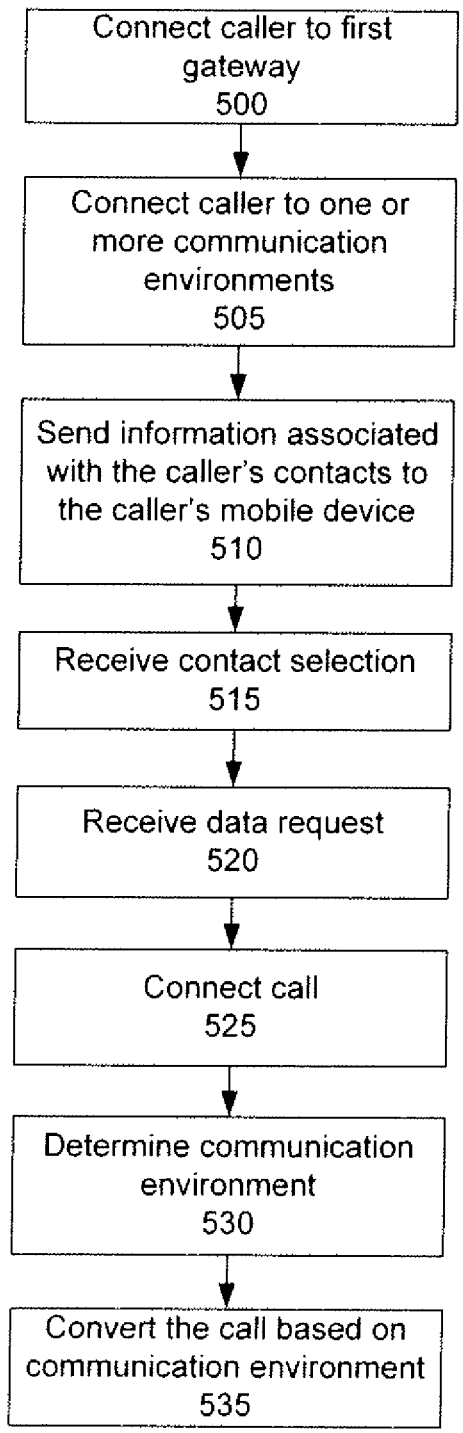
FIG. 5 illustrates a flow chart of an exemplary method of connecting a call according to an embodiment.
Figure 6:
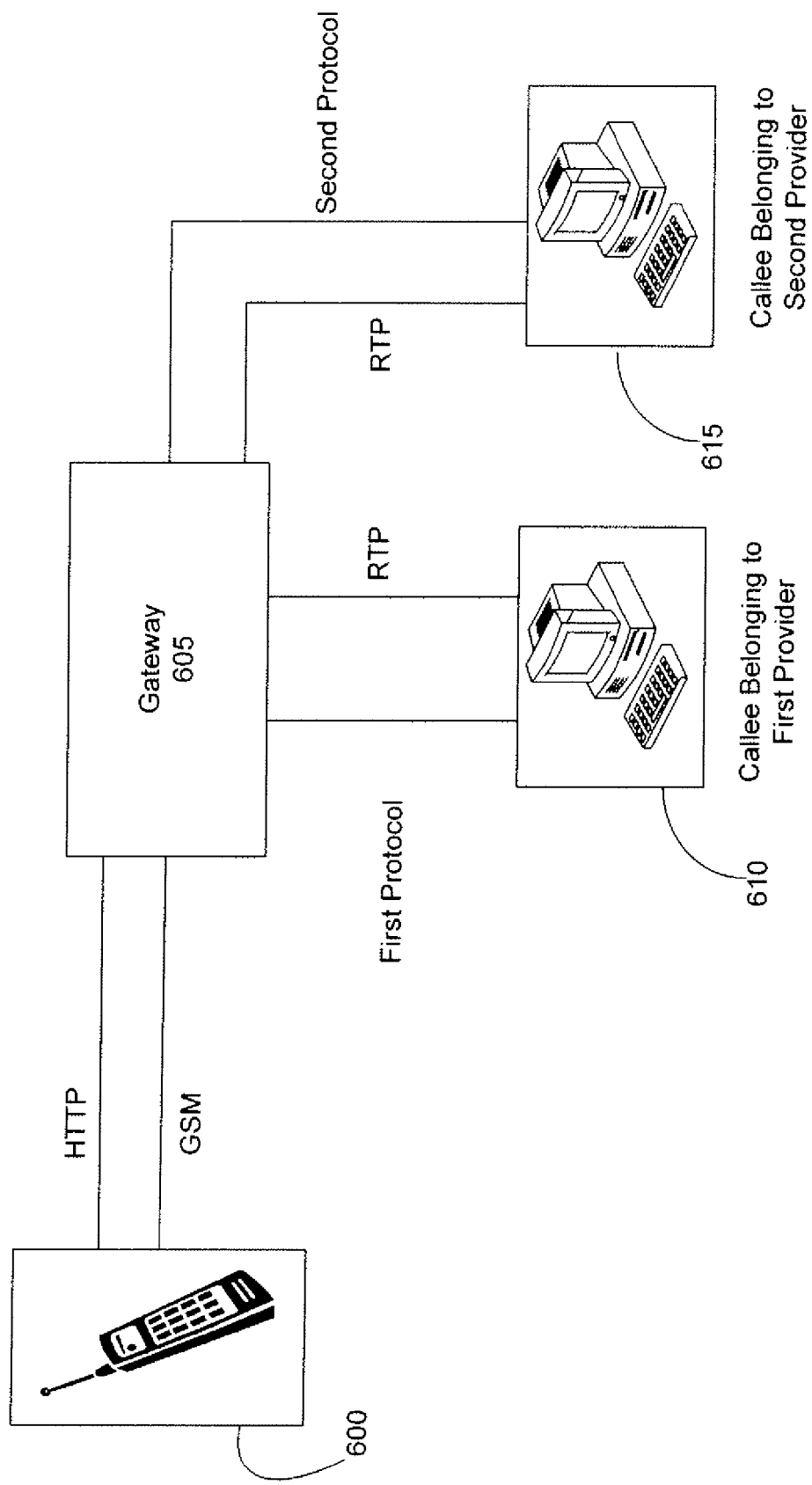
FIG. 6 illustrates an exemplary system for connecting a call according to an embodiment.

In an embodiment, a caller may be connected to one or more communication environments prior to determining which communication environment is associated with the intended callee. FIG. 5 illustrates a flow chart of an exemplary method of connecting a call according to an embodiment. FIG. 6 illustrates an exemplary system for connecting a call according to an embodiment.

A caller may be connected 500 to a gateway 605 via a data request, such as HTTP. The gateway 605 may connect 505 the caller to one or more communication environments. In an embodiment, the caller may be connected to a communication environment via a protocol associated with the communication environment. For example, a first communication environment may utilize a merged protocol, such as XMPP and a Jingle protocol, while a second communication environment may utilize an HTTP/DTBC protocol. The caller may be connected to both communication environments via the associated protocols.

In an embodiment, information associated with the caller's contacts, such as a contact list, may be sent 510 from the gateway 605 to caller's mobile device 600. In an embodiment, contacts belonging to a communication environment may be sent 510 via the protocol associated with the communication environment. For example, any contacts belonging to the first communication environment may be sent 510 via a XMPP+Jingle protocol, while any contacts belonging to the second communication environment may be sent 510 via a HTTP/DTBC protocol. In an embodiment, one or more unique dial codes associated with one or more contacts may be sent 510 to the mobile device 600.

In an embodiment, the caller may select a contact to call. This selection may be received 515 by the gateway 605. A data request may be received 520 by the gateway 605. In an alternate embodiment, the data request may be merged with the retrieval of information associated with one or more of the caller's contacts.

In an embodiment, the call may be connected 525 via a GSM audio channel between the caller's mobile device 600 and the gateway 605. The gateway 605 may determine 530 the communication environment associated with the callee and may convert 535 the call based on the determined communication environment. For example, if the caller wants to communicate with a callee who is a user of the first communication environment, the gateway 605 may complete the call over an XMPP +Jingle protocol. In an embodiment, both the audio and the data portions of the call may be completed over the protocol. Alternatively, the audio portion may be converted from the GSM channel to an RTP protocol. In an embodiment, the call may be completed between the caller's mobile device 600 and a computing device 610, 615 associated with the callee, such as a personal computer or the like.

Figure 7:
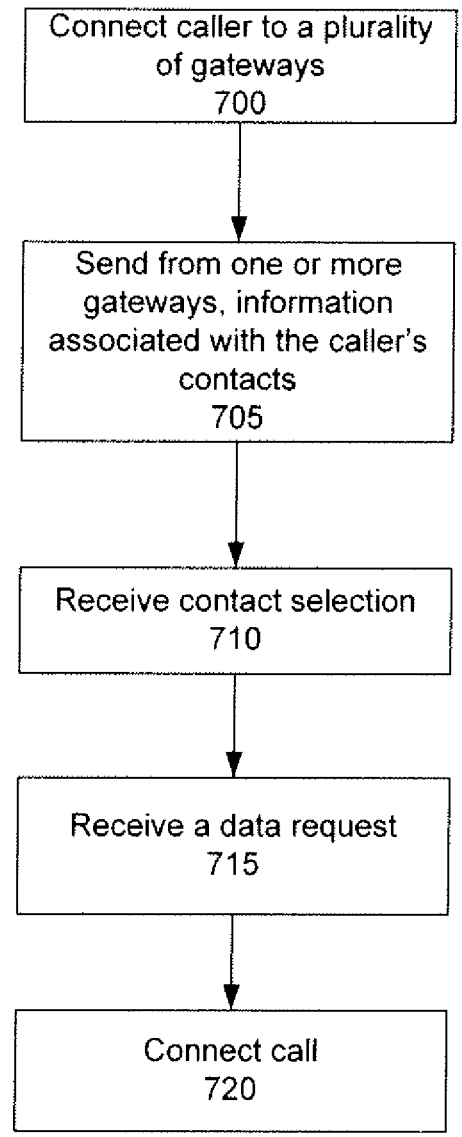
FIG. 7 illustrates a flow chart of an exemplary method of utilizing a plurality of gateways according to an embodiment.
Figure 8:
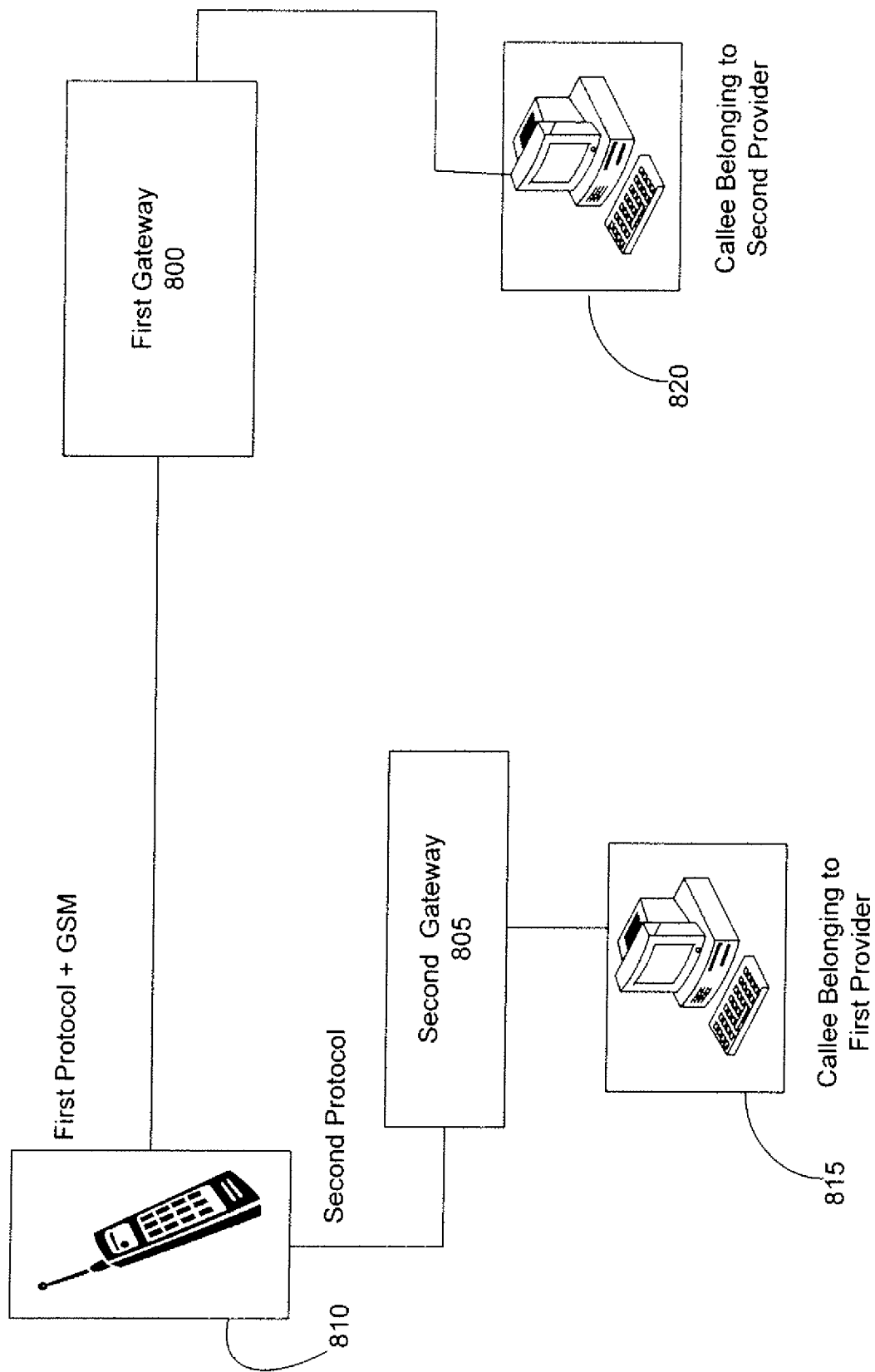
FIG. 8 illustrates an exemplary system of utilizing a plurality of gateways according to an embodiment.

In an embodiment, a caller may be connected to a plurality of gateways in order to communicate with a contact. FIG. 7 illustrates a flow chart of an exemplary method of utilizing a plurality of gateways according to an embodiment. FIG. 8 illustrates an exemplary system of utilizing a plurality of gateways according to an embodiment.

In an embodiment, a caller may be connected 700 to a plurality of gateways via a plurality of protocols. For example, a caller may be connected 700 to a first gateway 800 via a first protocol, and may be connected 700 to a second gateway 805 via a second protocol. In an embodiment, information associated with the caller's contacts, such as a portion of a contact list, may be sent 705 from one or more gateways to the caller's mobile device 810. In an embodiment, the contacts belonging to a communication environment may be sent via the protocol associated with the communication environment. For example, any contacts that belong to a first communication environment may be sent by the first gateway 800 via the first protocol.

In an embodiment, the caller may select a contact to call. This selection may be received 710 by one or more gateways 800, 805. A data request may be received 715 by one or more gateways 800, 805. The gateway associated with the communication environment of the callee may connect 720 the call to a computing device 815, 820 associated with the callee.

Figure 9:
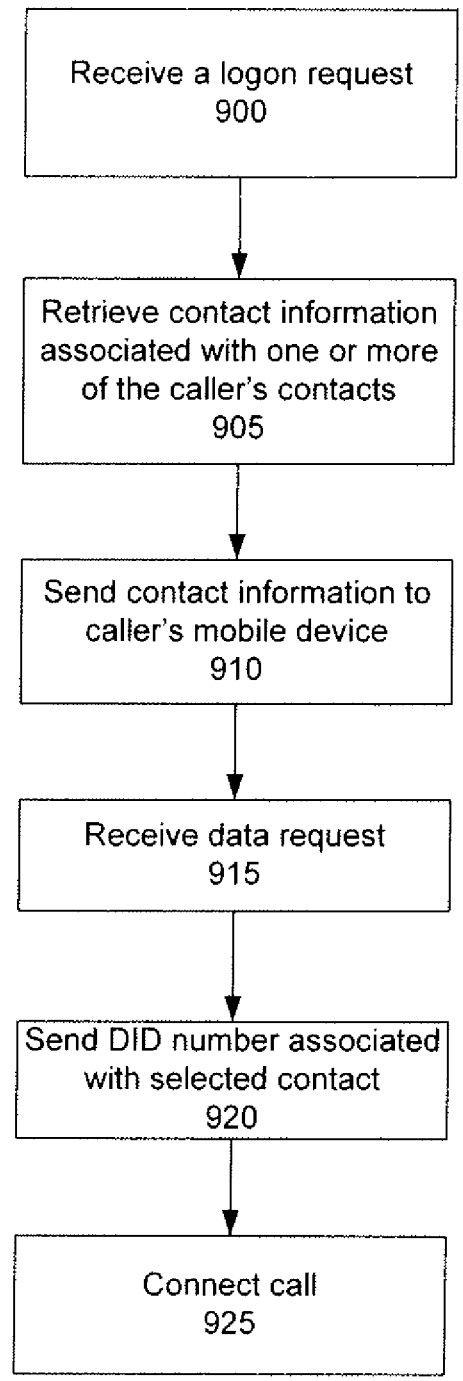
FIG. 9 illustrates a flow chart of an exemplary method of connecting a call via a single gateway according to an embodiment.
Figure 10:
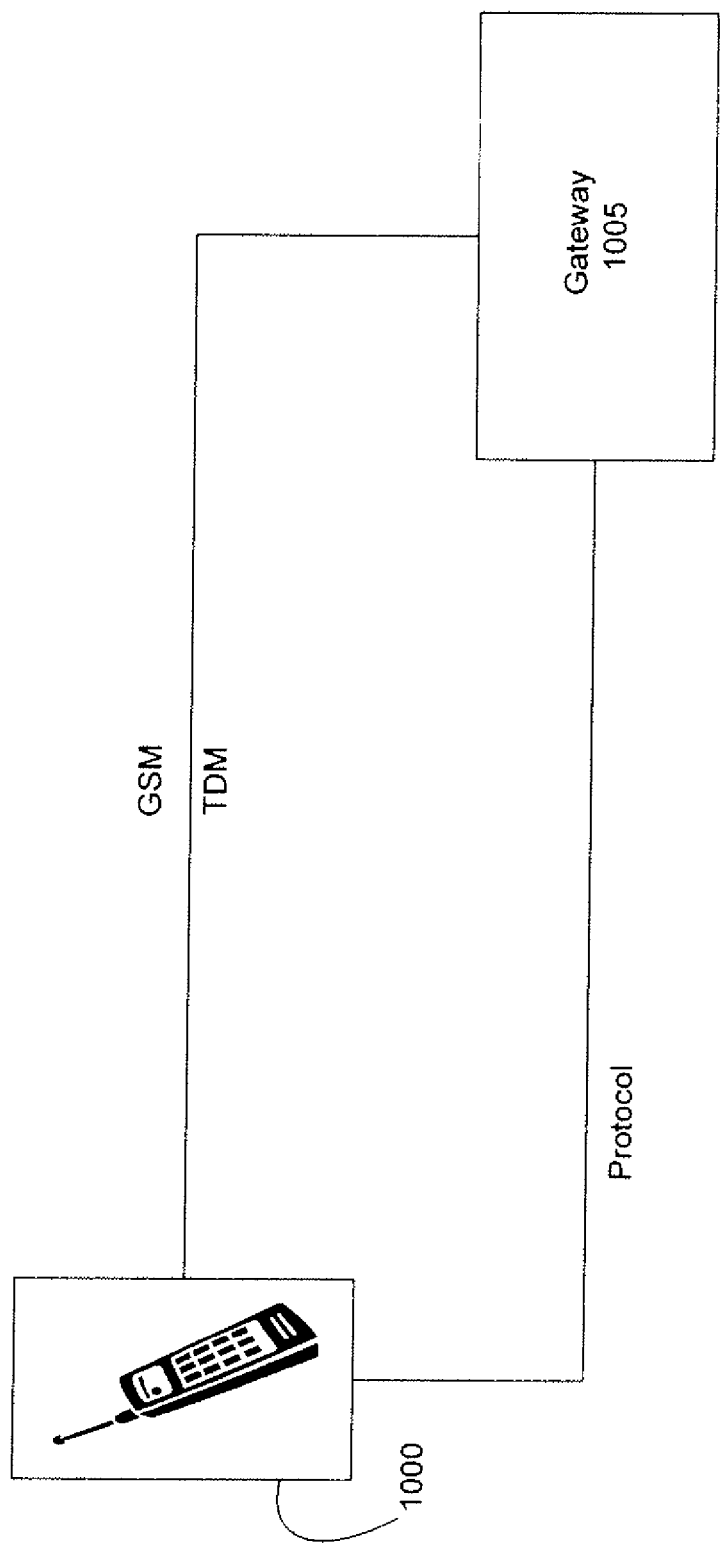
FIG. 10 illustrates an exemplary system for connecting a call via a single gateway according to an embodiment.
Figure 11:
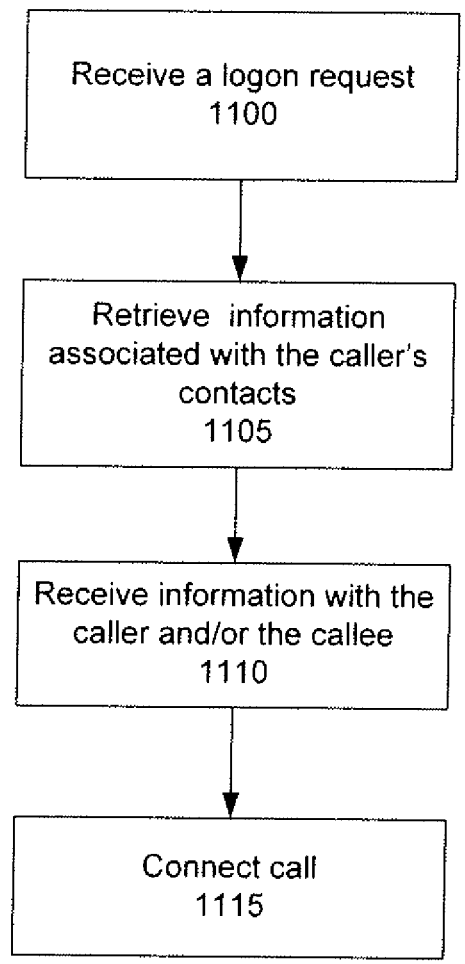
FIG. 11 illustrates a flow chart of an exemplary method of connecting a call according to an embodiment.

In an embodiment, a call may be connected between a caller and a callee via a single gateway. FIG. 9 illustrates a flow chart of an exemplary method of connecting a call via a single gateway according to an embodiment. FIG. 10 illustrates an exemplary system for connecting a call via a single gateway according to an embodiment.

A gateway 1005 may receive 900 a logon request from a caller via a mobile device 1000. In an embodiment, the caller may logon to the gateway 1005 via a protocol such as XMPP, Jingle or the like. The caller may logon to the gateway 1005 via a merged protocol. A merged protocol may comprise a plurality of protocols, such as XMPP and Jingle. In an embodiment, information associated with one or more of the caller's contacts, such as a contact list, may be retrieved 905 by the gateway 1005 and sent 910 to the mobile device 1000 via one or more protocols. The caller may select a contact from the contact list with whom to communicate. A data request may be received 915 by the gateway 1005 via one or more of the associated protocols. In an embodiment, a DID number associated with the contact may be sent 920 to the mobile device 1000. A DTMF sequence may also be sent to the mobile device 1000. In an embodiment, the call may be connected 925 via a GSM audio channel.

Figure 12:
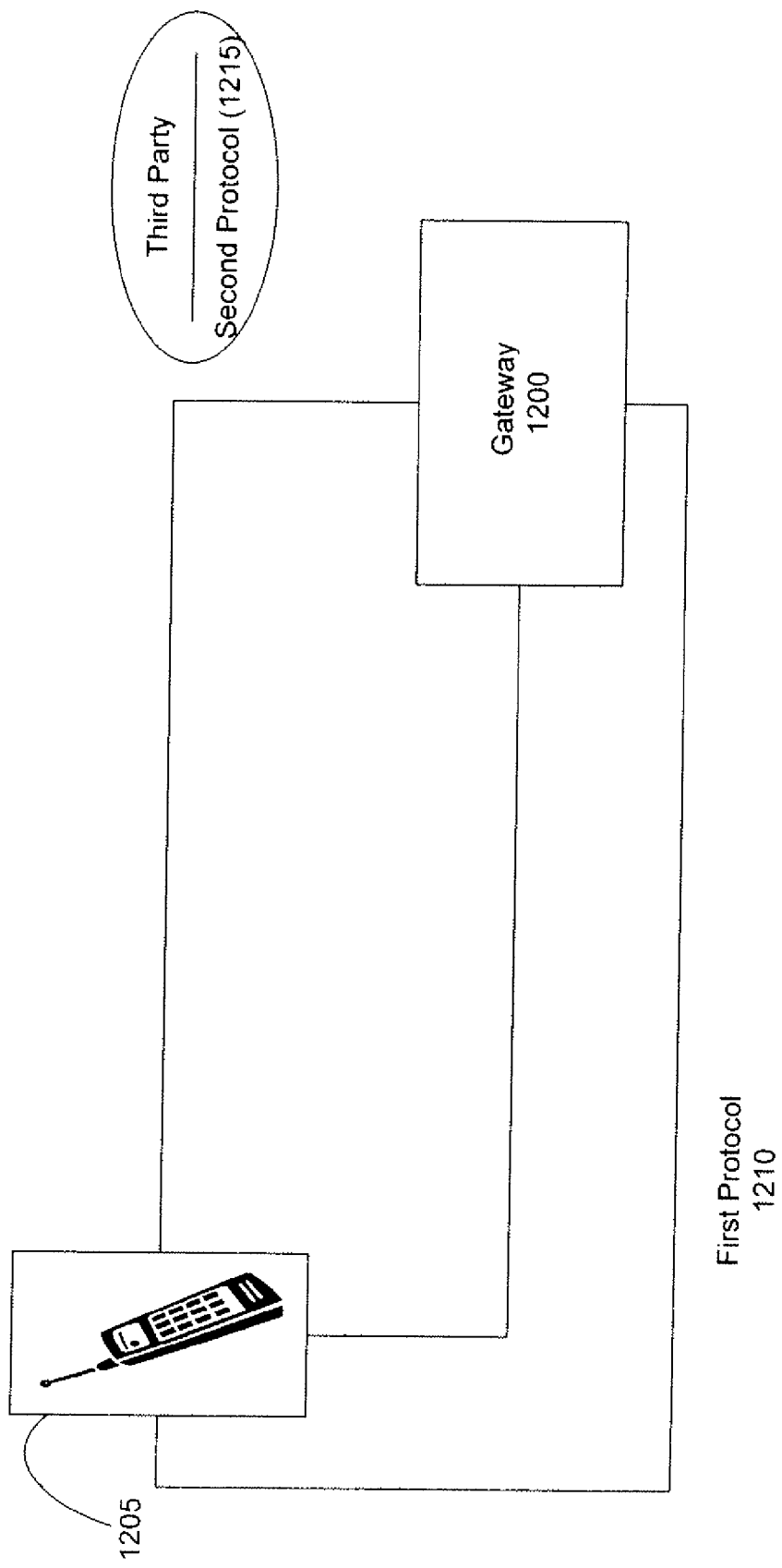
FIG. 12 illustrates an exemplary system for connecting a call according to an embodiment.

In an embodiment, a call may be connected via a merged gateway and a third party. FIG. II illustrates a flow chart of an exemplary method of connecting a call according to an embodiment. FIG. 12 illustrates an exemplary system for connecting a call according to an embodiment.

A logon request may be received 1100 by a gateway 1200 from a mobile device 1205. The request may be received 1100 over a first protocol 1210, such as XMPP. In an alternative embodiment, the request may be received 1100 over a second protocol 1215. In an embodiment, the second protocol 1215 may be associated with a third party, such as a service provider. For example, a user may logon to the gateway 1200 via HTTP, thus opening a channel to the third party/HTTP protocol.

In an embodiment, information associated with the caller's contacts, such as a contact list, may be retrieved 1105 by the gateway 1200 and sent to the mobile device 1205 via the first protocol 1210. The caller may select a contact from the contact list with whom to communicate. Information associated with the caller and/or the callee may be received 1110 by the gateway 1200 over the second protocol 1215, and the call may be connected 1115 using a GSM audio channel to enable voice.

It will be appreciated that various of the above-disclosed and other features and functions. or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of authenticating a caller and authorizing a callee in a user-device environment, the method comprising:
   receiving, by a first gateway, a logon request comprising information associated with the caller, wherein a second gateway determines whether the caller is a subscriber to a network based on at least a portion of the received caller information;
   when the caller is a subscriber, receiving, by the first gateway, information associated with the callee, wherein the callee belongs to a contact list associated with the caller; and
   determining, by the first gateway, whether the callee is authorized based on at least the callee information and one or more authorization preferences associated with the caller, wherein the one or more authorization preferences comprise a communication mode of a plurality of communication modes permitted between the caller and callee;
   wherein, when the callee is authorized, a call is connected between the caller and the callee.

2. The method of claim 1, wherein determining whether the caller is a subscriber comprises:
   comparing at least a portion of the caller information to at least a portion of information associated with one or more subscribers.

3. The method of claim 1, wherein determining whether the caller is a subscriber comprises:
   identifying, from the caller information, one or more of a MSISDN and a namespace identification associated with the caller;
   identifying one or more subscribers, wherein each subscriber has a corresponding MSISDN and namespace identification; and
   comparing one or more of the MSISDN and the namespace identification associated with the caller to one or more of the MSISDN and namespace identification associated with one or more subscribers.

4. The method of claim 1, wherein receiving information associated with the callee comprises one or more of the following:
   receiving a direct-inward-dialing number associated with the callee;
   receiving a namespace identification associated with the callee;
   extracting callee information from a user-to-user element field; or
   retrieving callee information from a storage medium.

5. The method of claim 1, wherein determining whether the callee is authorized comprises:
   identifying the one or more authorization preferences associated with the caller;
   comparing the one or more authorization preferences to at least a portion of the callee information.

6. The method of claim 5, wherein identifying the one or more authorization preferences comprises:
   identifying a MSISDN from the caller information; and
   identifying the one or more authorization preferences based on the identified MSISDN.

7. The method of claim 1, wherein connecting the call between the caller and the callee comprises:
converting, by the first gateway, a global system for mobile communication channel between a mobile device associated with the caller and the first gateway to a session initiation protocol.

8. The method of claim 1, wherein connecting the call between the caller and the callee comprises:
converting, by the first gateway, a global system for mobile communication channel between a mobile device associated with the caller and the first gateway to a session initiation protocol refer;
transmitting the session initiation protocol refer to a third gateway; and
connecting the call to a computing device associated with the callee via the third gateway.

9. The method of claim 1, wherein connecting the call between the caller and the callee comprises:
converting, by the first gateway, a global system for mobile communication channel between a mobile device associated with the caller and the first gateway to a real-time transport protocol.

10. A system for authenticating a caller and authorizing a callee in a user-device environment comprising:
a first gateway configured to authenticate the caller based on at least information associated with the caller and information associated with a plurality of subscribers; and
a second gateway configured to authorize the callee based on one or more authorization preferences associated with the caller and information associated with the callee, wherein the second gateway is in communication with the first gateway, wherein the callee belongs to a contact list associated with the caller, and wherein the one or more authorization preferences comprise a communication mode of a plurality of communication modes permitted between the caller and callee.

11. The system of claim 10, wherein the first gateway and the second gateway are in communication via a user-based protocol.

12. The system of claim 10, wherein the second gateway comprises a storage medium configured to:
store the subscriber information; and
map at least a portion of the caller information to the subscriber information.

13. The system of claim 10, wherein the second gateway comprises a storage medium configured to map at least a portion of the callee information to the one or more authorization preferences.

14. The system of claim 10, further comprising a third gateway in communication with the second gateway, wherein the third gateway is configured to:
receive a session initiation protocol refer from the second gateway; and
connect a call between a mobile device associated with the caller and a computing device associated with the callee.

15. The system of claim 10, wherein the second gateway is configured to convert a global system for mobile communication channel between a mobile device associated with the caller and the second gateway to a session initiation protocol.

16. The system of claim 10, wherein the second gateway is configured to convert a global system for mobile communication channel between a mobile device associated with the caller and the second gateway to a real-time transport protocol.

17. The method of claim 1, wherein the plurality of communication modes comprises two or more of chat only, voice only, both chat and voice, or blocked.

18. The method of claim 5, wherein the identifying the one or more authorization preferences comprises receiving the one or more authorization preferences from at least one of a mobile device associated with the caller, a service provider associated with the caller, or the first gateway.

19. An apparatus for authenticating a caller and authorizing a callee in a user-device environment, the apparatus comprising:
means for receiving, by a first gateway, a logon request comprising information associated with the caller, wherein a second gateway determines whether the caller is a subscriber to a network based on at least a portion of the received caller information;
means for receiving by the first gateway, when the caller is a subscriber, information associated with the callee, wherein the callee belongs to a contact list associated with the caller; and
means for determining, by the first gateway, whether the callee is authorized based on at least the callee information and one or more authorization preferences associated with the caller, wherein the one or more authorization preferences comprise a communication mode of a plurality of communication modes permitted between the caller and callee;
wherein, when the callee is authorized, a call is connected between the caller and the callee.

20. A non-transitory computer-readable medium for authenticating a caller and authorizing a callee in a user-device environment, comprising:
at least one instruction for receiving, by a first gateway, a logon request comprising information associated with the caller, wherein a second gateway determines whether the caller is a subscriber to a network based on at least a portion of the received caller information;
at least one instruction for receiving by the first gateway, when the caller is a subscriber, information associated with the callee, wherein the callee belongs to a contact list associated with the caller; and
at least one instruction for determining, by the first gateway, whether the callee is authorized based on at least the callee information and one or more authorization preferences associated with the caller, wherein the one or more authorization preferences comprise a communication mode of a plurality of communication modes permitted between the caller and callee;
wherein, when the callee is authorized, a call is connected between the caller and the callee.

21. An apparatus for authenticating a caller and authorizing a callee in a user-device environment, the apparatus comprising:
a component configured to receive, by a first gateway, a logon request comprising information associated with the caller, wherein a second gateway determines whether the caller is a subscriber to a network based on at least a portion of the received caller information;
a component configured to receive, by the first gateway, when the caller is a subscriber, information associated with the callee, wherein the callee belongs to a contact list associated with the caller; and
a component configured to determine, by the first gateway, whether the callee is authorized based on at least the callee information and one or more authorization preferences associated with the caller, wherein the one or more authorization preferences comprise a communication mode of a plurality of communication modes permitted between the caller and callee,
wherein, when the callee is authorized, a call is connected between the caller and the callee.

* * * * *